United States Patent [19]

Davis

[11] 4,104,158

[45] Aug. 1, 1978

[54] VOLUME AND TIME OF DAY CONTROL FOR WATER SOFTENER REGENERATION

[75] Inventor: Stephen H. Davis, Dayton, Ohio

[73] Assignee: Water Refining Company, Inc., Middletown, Ohio

[21] Appl. No.: 779,097

[22] Filed: Mar. 18, 1977

[51] Int. Cl.² .......................................... B01D 15/04
[52] U.S. Cl. .................................. 210/25; 210/30 R; 210/105; 210/139; 137/2
[58] Field of Search ............... 210/89, 96 R, 139, 140, 210/138, 25, 30 R, 105; 137/2

[56] References Cited

U.S. PATENT DOCUMENTS

| 3,160,008 | 12/1964 | Gestler | 210/89 |
| 3,358,712 | 12/1967 | Lane | 210/89 |
| 3,676,336 | 1/1972 | O'Brien et al. | 210/96 |
| 3,687,289 | 8/1972 | Tischler | 210/89 |

FOREIGN PATENT DOCUMENTS

| 2,009,628 | 1970 | France | 210/139 |

Primary Examiner—Charles N. Hart
Assistant Examiner—E. Rollins Cross
Attorney, Agent, or Firm—Biebel, French & Nauman

[57] ABSTRACT

A circuit for controlling the regeneration cycle of a water softener includes a flow meter which provides a pulse output of a frequency proportional to the flow rate of the water treated by the softener. A predetermined counter, responsive to the flow meter pulse output, provides a first enabling output when a first count is reached indicating that the capacity for treating a normal 24 hour supply of water remains and provides a second enabling output when a second count is reached indicating that the capacity for treating water has been depleted. A 24 hour timer is responsive to the first enabling output to provide a regeneration timer with a regeneration initiation signal at a preselected time during the 24 hour period following the first enabling output. The regeneration timer is directly responsive to the predetermined counter for initiation of regeneration immediately upon receipt of the second enabling signal.

7 Claims, 2 Drawing Figures

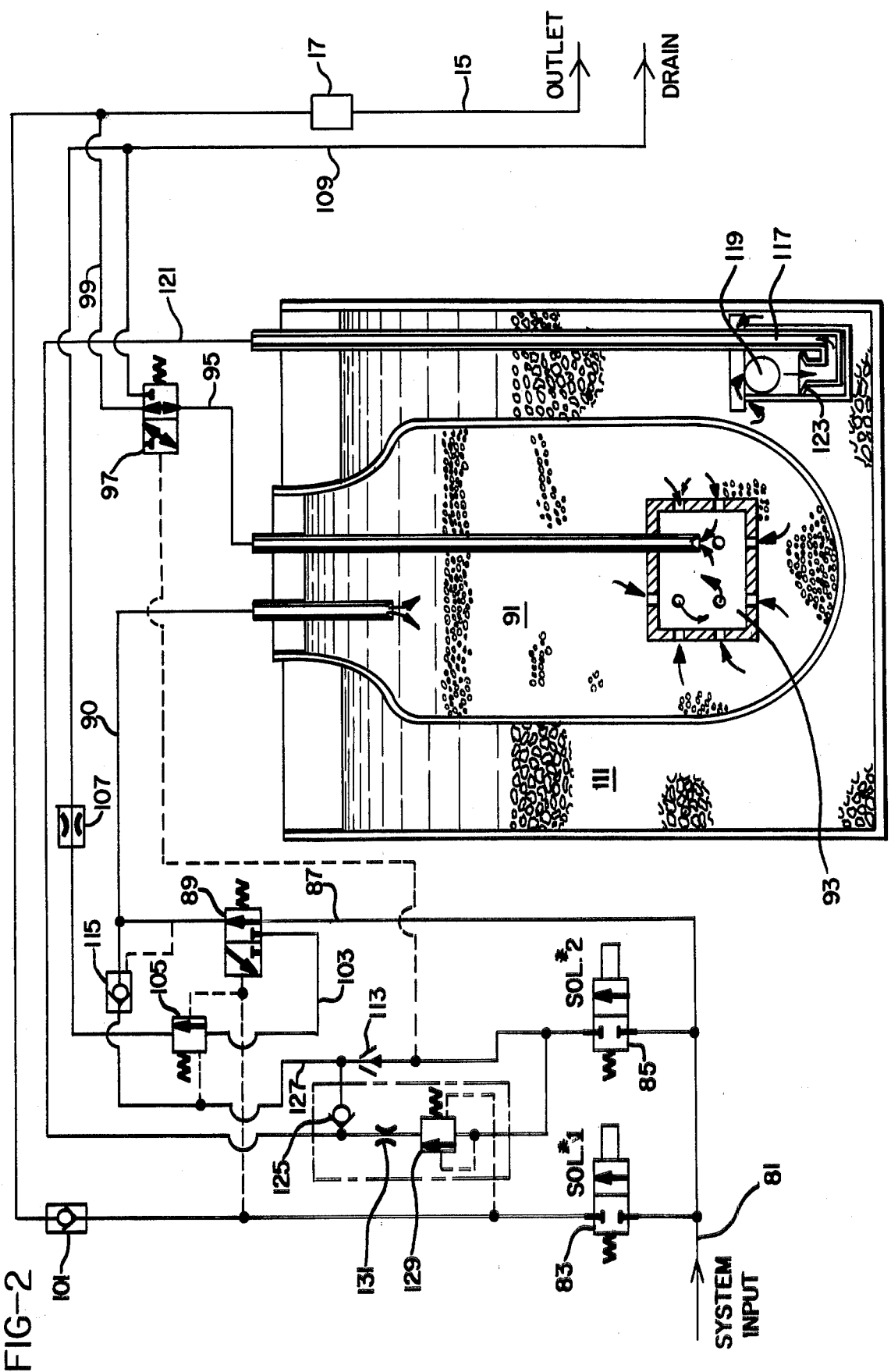

VOLUME AND TIME OF DAY CONTROL FOR WATER SOFTENER REGENERATION

BACKGROUND OF THE INVENTION

The present invention relates to water treating devices and, more particularly, to a control arrangement for controlling the regeneration of a water softener system.

Water softener systems of the type with which the present invention is used have a treatment tank filled with a resin material, such as zeolite. Hard water is passed through the zeolite bed and an ion exchange process takes place in which the sodium ions are exchanged for the hard metal ions in the water. The water treating efficacy of the zeolite bed will be gradually reduced and, after a predetermined quantity of water has been treated, the zeolite bed will be depleted. The zeolite bed may be regenerated, however, by passing a salt brine solution through it such that the ion exchange process is reversed. The maximum length of time between successive regeneration processes is dependent both upon the hardness of the water and upon the quantity of water which is treated.

Prior art regeneration devices have generally been controlled by simple timer arrangements in which a regeneration cycle is initiated, usually late at night, every several days. Such a regeneration control results, at best, in regeneration at times which roughly approximate those at which regeneration is actually needed. During periods of unusually high water usage, the zeolite bed may be depleted substantially before regeneration occurs, thus resulting in only partially treated water being supplied by the softener. Conversely, during periods of time in which little water is used, regeneration will occur too frequently and brine solution will be wasted.

Several prior art devices have been designed to minimize the waste of brine solution while providing more frequent regeneration during periods of heavy water use. One such device is shown in U.S. Pat. No. 3,176,844, issued Apr. 6, 1965, to Nelson in which the resistance between electrodes in the softener tank is measured to determine when the softening capability of the zeolite bed is depleted, and thereafter to initiate the regeneration operation. Although temperature compensation is provided in the Nelson device, the resistivity of the zeolite bed is not directly proportional to its softening capability and some errors may result.

Another approach taken to minimize the amount of brine solution required for regeneration is shown in U.S. Pat. No. 3,687,289, issued Oct. 29, 1972, to Tischler. In the Tischler device, a predetermined portion of the treated water is metered to a chamber having an adjustable water storage capacity. The water stored in the chamber is periodically directed to the brine storage tank. When the liquid level in the brine tank reaches a predetermined height, a timer is actuated resulting in regeneration of the system at a selected time during the following 24 hour time period. Although a definite improvement over the prior art, the Tischler device requires substantial hardware and initiates regeneration only at the predetermined time specified by the timer. The brine level chosen for actuation of the timer could be set such that the softener will be capable of thereafter treating a normal 24 hour supply of water. If, however, an unusually large quantity of water were treated, it is quite possible that the softening capability of the system would be depleted prior to initiation of the regeneration process.

Accordingly, it is seen that there is a need for a simple but accurate regeneration control which will monitor the quantity of water treated and initiate regeneration at a selected time when less than a day's capacity of softening remains or, alternatively, when the softening capacity of the system is completely depleted, which ever occurs first.

SUMMARY OF THE INVENTION

A control circuit and method for controlling initiation of the regeneration cycle of a water softener, which softener is capable of treating a predetermined quantity of water before requiring regeneration, includes a flow meter which senses the rate of water flow through the softener and provides a pulse output which is proportional in frequency to the flow rate. Predetermined counter means are responsive to the flow meter means and provide a first enabling output when a first count is reached indicating that the capacity for treating a normal 24 hour supply of water remains, and for providing a second enabling output when a second count is reached indicating that the capacity for treating water has been depleted. A 24 hour timer means has an input responsive to the first enabling output of the counter means and connects its input to an output once each day at a predetermined time. A regeneration timer means is responsive to the output from the 24 hour timer means and to the second enabling signal from the predetermined counter means for initiating and timing regeneration of the softener, whereby regeneration will be initiated at a predetermined time of day after the capacity of the softener is reduced to a 24 hour supply of water or when the capacity for treating water has been depleted, if such depletion should occur prior to the predetermined time of day.

Accordingly, it is an object of the present invention to provide a regenerable fluid treatment method and system in which regeneration is initiated at a preselected time subsequent to an indication that a predetermined treatment capacity remains or regeneration is initiated immediately if no treatment capacity remains; to provide such a treatment method and system in which the quantity of fluid being treated is measured and a timer enabled for regeneration after a first quantity of fluid has been treated or a regeneration cycle initiated immediately after a second quantity of fluid has been treated; and, to provide such a method and system in which a simple electrical circuit executes the desired control.

Other objects and advantages of the invention will be apparent from the following description, the accompanying drawings and the appended claims.

BRIEF DESCRIPTION OF THE DRAWINGS

FIG. 2 illustrates a conventional regenerable softener arrangement of the type for use with the present invention.

DETAILED DESCRIPTION OF THE PREFERRED EMBODIMENT

Figure 1:
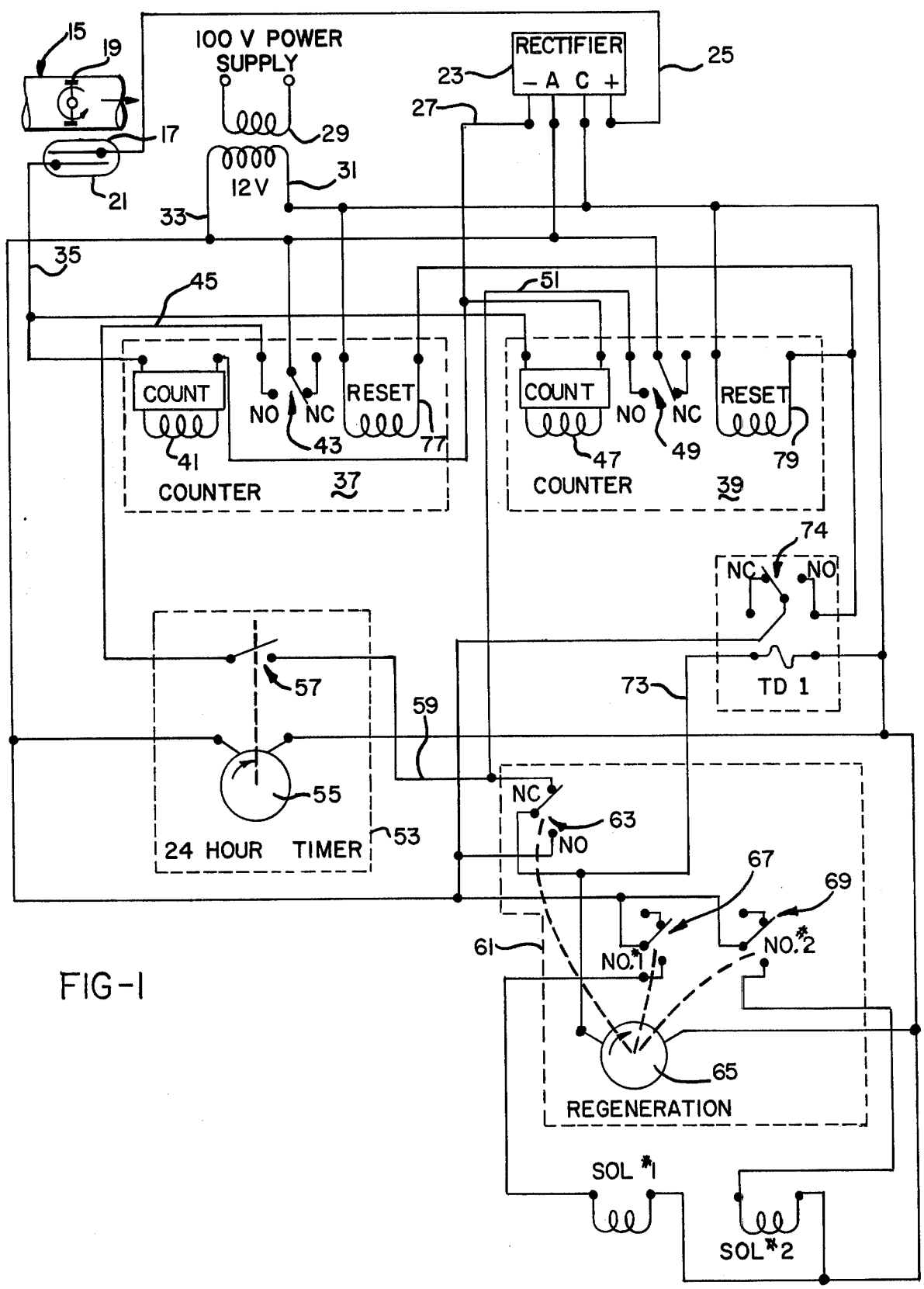
FIG. 1 is a schematic representation of the control circuit of the present invention.

Reference is made now to FIG. 1, in which the control circuit of the present invention for controlling the regeneration cycle of a water softener system is shown. Water softeners of the type with which the present invention is intended to be used are regenerated periodically in order to maintain their water softening efficacy. Assuming that the hardness of the water to be treated remains relatively constant, a softener of this type will effectively treat a substantially constant quantity of water between successive regeneration cycles. The control circuit of the present invention monitors the amount of water treated by the softener to determine when regeneration is necessary.

As seen in FIG. 1, the water output line 15 from the softener includes flow meter means 17 comprising turbine 19 and an associated reed switch 21. Turbine 19 may include one or more magnets which will periodically close reed switch 21 as the turbine rotates. Reed switch 21 is connected to a rectifier 23 which provides a D. C. potential on lines 25 and 27. Transformer 29 steps down 110 volts and applies 12 volts across its secondary on lines 31 and 33 to which rectifier 23 is connected. The periodic closing of reed switch 21 results in a pulse train on line 35 which is proportional in frequency to the rate of flow of the treated water through line 15.

A predetermined counter means includes counter 37 and counter 39 which are both responsive to the flow meter pulse output on line 35. Counter 37 acts as a first means which accumulates the flow meter pulse train output, thus effectively integrating the flow rate of the treated water. The counter may be set such that the count coil 41 will be energized after a predetermined quantity of water has been treated and a predetermined count has been reached. A predetermined electric counter with electrical resets of the type sold as Model 3v515.13 and available from Kessler Ellis, 121 First Avenue, Atlantic Heights, N.J., 07716, may be used for counters 37 and 39. When the predetermined count has been reached in counter 37, normally open contacts 43 will be closed resulting in the application of a first enabling regenerate output signal to line 45.

Similarly, counter 39 includes a count coil 47 which is enabled when the counter reaches a predetermined count and which results in contacts 49 being closed and a second enabling regenerate output signal being applied to line 51. In effect, therefore, counters 37 and 39 integrate the pulse train output from flow meter means 17 and provide output signals when the integrals reach predetermined levels.

Counter 37 will be set with a predetermined count level such that it will provide an output when a quantity of water, equal to the capacity of the softener less an average day's supply, has been treated. Assuming that counter 37 reaches its predetermined count and supplies a first enabling output on line 45, this regenerate signal is applied to a 24 hour clock timer means 53. The motor 55 associated with the timer 53 is mechanically linked to switch 57 such that switch 57 is closed once each day. Timer 53 will, therefore, apply a regenerate signal on line 59 when the preselected time of day first occurs after counter 37 reaches its predetermined count.

In a typical operational sequence, counter 37 will accumulate pulses until it reaches its predetermined count and then will effectively enable timer 53 via line 45. Timer 53 will typically be set to initiate regeneration at a convenient time period, such as late at night when it is expected that water usage will be minimal. Since the enabling signal is applied to line 45 by counter 37 while the treatment capacity for a 24 hour time period remained, it is expected that the treatment capacity of the softener will usually not be depleted before the regeneration cycle is initiated by the timer 53.

If there were to be an extremely heavy usage of water after counter 37 provided its enabling output on line 45 but before timer 53 reached its preselected time of day, however, it is possible that the regeneration capacity of the softener could be exhausted and that untreated or partially treated water might pass through the softener. To preclude this possibility, counter 39 is provided and is set to accumulate a predetermined number of pulses and provide an output when a quantity of water, equal to the treatment capacity of the softener, has been treated. If this occurs before timer 53 reaches its preselected time of day, the second enabling regenerate output signal will be applied on line 51 to line 59 of the regeneration timer means 61.

When power is applied to line 59 and switch 63 is in the position indicated, regeneration timer motor 65 will begin its regeneration timing cycle. During the regeneration cycle, switches 67 and 69 will be closed for appropriate periods of time, energizing solenoids 1 and 2 which control solenoid actuated valves which are associated with the softener, and described more fully below. After motor 65 has been operated for several minutes, a cam linked to motor 65 will move switch 63 into its lower position in which the normally open contacts of switch 63 are closed. Timer 53 will thereafter be effectively by-passed and the motor 65 connected to line 71. When the regeneration cycle is complete, the cam associated with switch 63 will return the switch to its upper position, thus removing power from motor 65.

When regeneration is initiated by either counter 37 or counter 39, an enabling signal will be applied on line 73 to the coil of reset delay timer TD1. After a preselected period of time, normally open contacts 74 will be closed resulting in counters 37 and 39 being reset. The time delay period chosen for timer TD1 will be sufficient to keep motor 65 energized until after switch 63 has connected the motor 65 to line 71. Resetting the counters prior to this would open normally open contacts 43 and 49 and deenergize the motor 65 before completion of the regeneration cycle. It is clear that other delay arrangements could be used to perform this function.

Reference is now made to FIG. 2 which illustrates a typical softener system of the type with which the present invention may be used. In the usual service of the softener, raw, untreated water is received on line 81. Since solenoid-actuated valves 83 and 85 are not actuated, the untreated water flows through line 87, valve 89, line 90, and into treatment tank 91. Tank 91 typically contains a bed of zeolite resin which, through an ion exchange process, softens the water. Outlet distributor 93 receives the treated water which then flows through line 95, valve 97, line 99, and out outlet line 15.

When regeneration is desired, solenoid 1 is actuated, thus placing valve 83 into its left-most position and initiating a backwash cycle. During the backwash cycle, the softening system is bypassed via valve 83 and check valve 101. At the same time, untreated water will be supplied from line 15 via line 99, valve 97, and line 95 to the outlet distributor 93 in the resin tank 91. This backwash process will loosen the resin bed and facilitate regeneration of the zeolite. The water will then flow out of line 90 and, via pilot actuated valve 89, to line 103. Pilot actuated valve 105 will also be actuated and will pass this water through the backwash flow control valve 107 to drain line 109.

After sufficient backwashing, solenoid 2 will also be energized, thus actuating valve 85 into its left-most position. The brining cycle will now begin in which a brine solution from brine tank 111 will be supplied to tank 91. When solenoid 2 actuates valve 85, the water flow through jet 113 and check valve 115 will siphon the brine solution out of tank 111 via air check valve 117. Air check valve 117 includes a float 119 and is provided to insure that line 121 is closed when the fluid level in the brine tank drops to the level of the valve seating arrangement 123. Brine solution will be siphoned through line 121 and will be provided through check valve 125 to line 127. The brine solution will pass through line 90, tank 91, line 95 and, since pilot actuated valve 97 will be actuated, the brine solution will flow into drain line 109.

After the air check valve 117 closes, siphoning will be terminated. Water will continue to flow from line 81 through jet 113 and tank 91, thus providing a slow rinse cycle.

Double pilot actuated valve 129 is spring biased such that is will remain normally closed when receiving pilot pressure on both sides. If solenoid 1 is now deenergized, however, valve 83 will be deenergized, thus removing the pilot pressure from the right side of valve 129. Valve 129 will therefore be pilot actuated open and, since it is across jet 113, the siphoning effect of the jet will be terminated. Additionally, the pilot signal will be removed from line valve 89 with the result that water will begin flowing through line 90 into tank 91. A fast rinse cycle will thus be initiated. Since at this point, valve 85 will continue to be actuated, pilot actuated valve 97 will continue to supply the output from the tank 91 to the drain line 109.

During the fast rinse cycle, water will be supplied through valve 95, valve 129, to line 121 such that brine tank 111 will be refilled with water. Flow control valve 131 is provided to insure that the proper quantity of water is added to the brine tank 111.

At the conclusion of the fast rinse and brine tank refill cycles, solenoids 1 and 2 will be deenergized and the ordinary service cycle, previously described, will be resumed.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. A control circuit for controlling initiation of the regeneration cycle of a water softener, which softener is capable of softening a predetermined quantity of water before requiring regeneration, comprising:
    flow meter means for sensing the rate of water flow through said softener and providing a pulse output, the frequency of which is proportional to the flow rate,
    predetermined counter means, responsive to said flow meter pulse output for providing a first enabling output when a first count is reached indicating that the capacity for treating a normal 24 hour supply of water remains, and for providing a second enabling output when a second count is reached indicating that the capacity for treating has been depleted,
    timer means, having an input responsive to the first enabling output of said counter means, for connecting its input to an output once each timer cycle at a predetermined time, and
    regeneration timer means, responsive to the output from said timer means and to said second enabling output from said counter means for initiating and timing softener regeneration whereby regeneration will be initiated at a predetermined time of day after the capacity of the softener is reduced to a 24 hour supply of water or when the capacity for treating water has been depleted, if such depletion of the water should occur prior to said predetermined time of day.

2. The circuit of claim 1 further comprising reset means responsive to the initiation of regeneration timer operation to reset said counter means to its initial count condition.

3. The circuit of claim 1 in which said timer means is a 24 hour timer and in which said timer input is connected to said timer output once each day at a predetermined time.

4. A softener control for initiating the regeneration cycle, comprising:
    means for sensing the flow rate of water through the softener and for providing a pulse train proportional in frequency thereto,
    first means for accumulating the pulses in said pulse train and for providing a first regenerate signal when a quantity of water equal to the capacity of the softener less an average day's supply has been treated,
    second means for accumulating the pulses in said pulse train and for providing a second regenerate signal when a quantity of water equal to the capacity of the softener has been treated,
    clock means responsive to said first regenerate signal for providing a third regenerate signal at a preselected time of day next following the receipt of said first regenerate signal, and
    regenerate control means, responsive to said second and third regenerate signals, for actuating and controlling the softener valves during regeneration, whereby a regeneration cycle is initiated immediately whenever an amount of water equal to the capacity of the softener has been treated or whereby a regeneration cycle is initiated at a preselected time of day next occuring after an amount of water equal to the capacity of the softener less an average day's supply has been treated.

5. A method of maintaining a water softening device in a sufficiently regenerated condition for water treatment, said water softening device being capable of treating a predetermined maximum quantity of water before being regenerated, comprising the steps of:
    monitoring the flow rate of water through the softener device and providing a pulse train signal, the frequency of which is proportional to the flow rate,
    integrating said pulse train over a period of time, and initiating a regeneration cycle,
        when the integral of the pulse train signal reaches a level indicating that the predetermined maximum quantity of water has been treated, or
        at a selected time of day after said pulse train integral reaches a level indicating that a predetermined minimum quantity of water may thereafter be treated, whichever occurs first.

6. A control circuit for initiating water softening regeneration, comprising:

flow rate meter means providing a first output indicative of the flow rate of treated water from the softener, first integrator means for integrating said first output and providing a second output when a predetermined quantity of water has been treated, second integrator means for integrating said first output and providing a third output signal when a second predetermined quantity of water has been treated, said second predetermined quantity of water being less than said first predetermined quantity of water by an amount approximating the average usage for a 24 hour period, timer means, responsive to said second integrator means, for providing a fourth output when a predetermined time of day occurs after said third output, and means for initiating and controlling regeneration upon receipt of said first or fourth outputs, whichever occurs first.

7. A water softener system comprising:

untreated water inlet means for receiving water to be treated, treated water outlet means for providing treated water, water softener means, connected to said water inlet and outlet means, and including a water treatment tank containing a regeneratable treatment material for treating water passing through said tank, regeneration means, operatively connected to said water softener means, for periodically regenerating the treatment material in said water treatment tank, and control means for controlling initiation and timing of regeneration cycles of said water treatment material by said regeneration means, said control means including flow meter means for sensing the rate of water flow through said softener and providing a pulse output, the frequency of which is proportional to the flow rate, predetermined counter means, responsive to said flow meter pulse output for providing a first enabling output when a first count is reached indicating that the capacity for treating a normal 24 hour supply of water remains, and for providing a second enabling output when a second count is reached indicating that the capacity for treating water has been depleted, timer means, having an input responsive to the first enabling output of said counter means, for connecting its input to an output once each timer cycle at a predetermined time, and regeneration timer means, responsive to the output from said timer means and to said second enabling signal from said counter means for initiating and timing softener regeneration whereby regeneration will be initiated at a predetermined time of day after the capacity of the softener is reduced to a 24 hour supply of water or when the capacity for treating water has been depleted, if such depletion of the water should occur prior to said predetermined time of day.

* * * * *

UNITED STATES PATENT AND TRADEMARK OFFICE
CERTIFICATE OF CORRECTION

PATENT NO. : 4,104,158
DATED : August 1, 1978
INVENTOR(S) : Stephen H. Davis

It is certified that error appears in the above-identified patent and that said Letters Patent are hereby corrected as shown below:

Column 5, line 67, after "treating" should be --water--

Signed and Sealed this

Thirteenth Day of February 1979

[SEAL]

Attest:

RUTH C. MASON
Attesting Officer

DONALD W. BANNER
Commissioner of Patents and Trademarks